United States Patent Office 2,957,879
Patented Oct. 25, 1960

2,957,879
SUBSTITUTED 2-DIPHENYLMETHYL-PIPER-
IDINE COMPOUNDS

Karl Hoffmann and Jules Heer, Binningen, Ernst Sury, Basel, and Ernst Urech, Binningen, Switzerland, assignors to Ciba Pharmaceutical Products, Inc., Summit, N.J., a corporation of New Jersey No Drawing. Filed June 11, 1954, Ser. No. 436,227

Claims priority, application Switzerland July 6, 1953

2 Claims. (Cl. 260—293)

This invention relates to the manufacture of 2-diphenyl-methyl-piperidine compounds which are substituted at least at the ring nitrogen atom by a lower aliphatic hydrocarbon radical, especially methyl. It also relates to the salts of these compounds.

These new piperidine compounds show a stimulating effect on the central nervous system which is exhibited by an increase of spontaneous motor activity. It can be used for pharmaca having said stimulating effect.

The new compounds are obtained by treating with a hydrogenating agent an appropriately substituted 2-di-phenymethyl-pyridine or a pyridinium compound thereof N-substituted by a lower aliphatic hydrocarbon radical, substituting any resulting secondary piperidine at the ring nitrogen atom by a lower aliphatic hydrocarbon radical and, if desired, preparing a salt of a resulting piperidine.

Starting materials which are not known can be prepared, for example, by reacting an appropriate diphenyl acetic acid derivative, such as a diphenyl acetic acid nitrile, with a 2-halogen pyridine, then splitting off the functionally converted carboxyl group and, if desired, quaternating the resulting pyridine compound.

The hydrogenation can be carried out with agents which are known for the hydrogenation of a pyridine ring. For example, hydrogenation may be carried out with hydrogen in the presence of a catalyst, advantageously a precious metal catalyst, such as platinum, or in the presence of nickel or copper chromite. For the N-substitution of secondary piperidines, the usual agents can be used.

Depending on the procedure used, the new compounds are obtained in the form of bases or salts. From the salts, the free piperidine bases can be obtained in per se conventional manner. From the latter, salts can be made by reaction with an acid suitable for the formation of therapeutically useful salts such, for example, as hydrohalic acids, sulfuric acid, nitric acid, phosphoric acid, thiocyanic acid, acetic acid, propionic acid, oxalic acid, malonic acid, succinic acid, malic acid, methane sulfonic acid, ethane sulfonic acid, oxyethane sulfonic acid, benzene or toluene sulfonic acid or a therapeutically active acid.

The following examples illustrate the invention, the parts being by weight unless otherwise stated and the relationship of parts by weight to parts by volume being the same as that of the gram to the cubic centimeter.

Example 1

24 parts of 2-diphenylmethyl-piperidine, 18 parts of an aqueous formaldehyde solution of 37 percent strength (corresponding to 5.8 parts of formaldehyde) and 17.6 parts of formic acid are heated for 4 hours at 110–120° C. The mixture is then rendered alkaline with concentrated caustic soda solution, and the precipitated oil is taken up in ether. After washing and drying the ethereal extract, the solvent is evaporated and the residue is distilled under a high vacuum. The resulting 2-diphenyl-methyl-1-methyl-piperidine of the formula

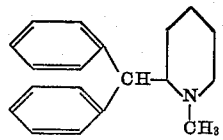

boils at 152–154° C. under 0.03 mm. pressure, and melts at 62–64° C.

By reacting this base with a slight excess of picric acid in solution in methanol the picrate of the base is obtained melting at 181–182° C.

The 2-diphenylmethyl-piperidine used as starting material can be prepared as follows:

36.75 parts of 2-diphenylmethyl-pyridine, dissolved in 150 parts by volume of glacial acetic acid, are agitated with 1 part of platinum oxide as catalyst at 40–45° C. in an atmosphere of hydrogen until hydrogen is no longer absorbed. The glacial acetic acid is evaporated in vacuo, the residue is rendered alkaline with concentrated caustic soda solution, and the oil which separates is taken up in ether. After washing and drying the ethereal extract, the solvent is evaporated, the residue is dissolved in a small amount of absolute ethyl acetate, and mixed with an excess of hydrogen chloride dissolved in ethyl acetate. The resulting hydrochloride of 2-diphenylmethyl-piperidine of the formula

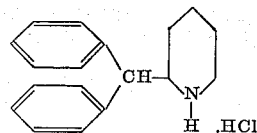

obtained in a state of high purity, is recrystallized from a mixture of methanol and ethyl acetate, and then melts at 286–287° C. (with decomposition).

The 2-diphenylmethyl-pyridine mentioned above may be prepared as follows:

193 parts of diphenyl-acetonitrile are heated in a stirring vessel with 60 parts of pulverized sodamide in 500 parts by volume of absolute toluene for 1½ to 2 hours at 120–130° C. The contents of the flask are then cooled to 70° C., and 238 parts of 2-bromopyridine are introduced dropwise. The exothermic reaction is so controlled by cooling that the temperature does not exceed 85° C. After the addition of the bromopyridine the reaction mixture is heated for a further 3 hours at 120–130° C. After cooling, there are cautiously added dropwise, while cooling with ice, first 50 parts by volume of methanol and then 200 parts by volume of water, and then the basic constituents are taken up with hydrochloric acid of 20 percent strength. The acid extract is rendered alkaline with caustic soda solution of 40 percent strength, the resulting crystalline precipitate is filtered off with suction, washed with a large quantity of water, dried on the filter, and recrystallized from methanol. In this manner there are obtained 208 parts of diphenyl-pyridyl-(2)-acetonitrile melting at 123–125° C.

208 parts of diphenyl-pyridyl-(2)-acetonitrile, 1000 parts by volume of methanol, 224 parts of potassium hydroxide and 335 parts by volume of water are heated for 10 hours in an autoclave at 215–225° C. After cooling the mixture, the excess of methanol is evaporated, the residue is extracted with ether, the ethereal extract is washed with water and dried over sodium sulfate. After distilling the solvent the residue is distilled in a high vacuum, 2-diphenylmethyl-pyridine passing over at 157–159° C. under 0.025 mm. pressure. It solidifies in crystalline form immediately and melts at 60–61° C.

By reaction with dimethyl sulfate there is obtained 2-diphenyl-1-methyl-pyridinium-methosulfate.

Example 2

18 parts of 2-dipheylmethyl-1-methyl-pyridinium methosulfate, dissolved in 150 parts by volume of methanol, are agitated with 0.5 part of platinum oxide at 40–45° C. in an atmosphere of hydrogen until hydrogen is no longer absorbed. After removing the methanol, the mixture is rendered alkaline with caustic soda solution and the precipitated oil is extracted with ether. After washing and drying the ethereal extract, the solvent is evaporated and the residue is distilled in a high vacuum, during which 2-diphenylmethyl-1-methyl-piperidine passes over at 152–154° C. under 0.03 mm. pressure in the form of a colourless oil which soon solidifies. When reacted with picric acid in solution in methanol, it yields a picrate which melts a 180–182° C. and is identical with the picrate described in Example 1.

Example 3

36 parts of 2-diphenylmethyl-piperidine are heated at 100° C. for 2 hours with 9.5 parts of allylbromide and 50 parts by volume of benzene. The reaction mass is then rendered alkaline with concentrated caustic soda solution and the resulting base taken up in ether. The ether-benzene solution is washed, dried and evaporated to dryness, and the residue distilled. There is obtained the 2-diphenylmethyl-1-allyl-piperidine of the formula

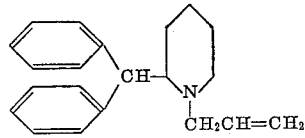

as a colourless oil boiling at 170–172° C. under 0.03 mm. pressure.

By reacting this base with a slight excess of picric acid in methanolic solution, the picrate of melting point 193–194° C. is obtained.

Example 4

14 parts of the 2-[(para-chloro-phenyl)-phenyl-methyl-methyl]-piperidine, 18 parts of a solution of formaldehyde of 37 percent strength, and 18 parts of formic acid are heated for 4 hours at 115–120° C. Concentrated caustic soda solution is added until the reaction is alkaline, and the precipitated oil is taken up in ether. After washing the ethereal extract with water, drying and evaporating the solvent, the residue is distilled. The 2-[(para - chloro - phenyl) - phenyl - methyl] - 1 - methyl-piperidine of the formula

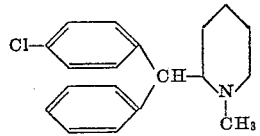

boils at 165–167° C. under 0.02 mm. of pressure.

The starting material used in this reaction can be prepared as follows:

27.95 parts of 2-(p-chlorophenyl-phenyl-methyl)-pyridine dissolved in 150 parts by volume of glacial acetic acid are agitated with 1 part of platinum oxide as catalyst at 40–45° C. in an atmosphere of hydrogen until 3 mols of hydrogen have been absorbed. The glacial acetic acid is evaporated in vacuo, the residue dissolved in water, rendered alkaline with concentrated caustic soda solution and the precipitated oil taken up in ether. After washing and drying the ethereal extract, the solvent is evaporated and the residue distilled in high vacuum. The 2-(p-chlorophenyl-phenyl-methyl)-piperidine of the formula

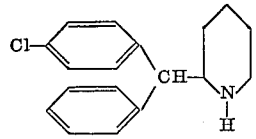

melts at 170–173° C. under 0.01 mm. of pressure.

The above mentioned starting material can be prepared by condensing 114 parts of p-chlorophenyl-phenyl-acetonitrile and 30 parts of sodamide in 300 parts by volume of toluene with 119 parts of 2-bromo-pyridine and then hydrolysing the condensation product with 76 parts of potassium hydroxide in 115 parts by volume of water and 350 parts by volume of methanol at 220° C. The 2-(p-chlorophenyl-phenyl-methyl)-pyridine boils at 182–185° C. under 0.01 mm. of pressure and melts after recrystallization from petroleum ether at 82–83° C.

Example 5

49.5 parts of 2-[di-(para-chloro-phenyl)-methyl]-pyridinium-methosulfate dissolved in 250 parts by volume of methanol are agitated with 0.5 part of platinum oxide at 40–45° C. in a hydrogen atmosphere until no more hydrogen is taken up. The whole is filtered, the methanol evaporated and caustic soda solution is added to the residue until it shows an alkaline reaction. The precipitated oil is taken up in ether, the ethereal solution is washed with water, dried, filtered and evaporated. The residue is distilled, the 2-[di-(para-chloro-phenyl)-methyl]-1-methyl-piperidine of the formula

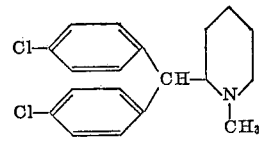

passing over at 196–197° C. under 0.01 mm. of pressure. It forms hydrochloride melting at 261–262° C. For the preparation of the starting material 15.7 parts of 2-(p:p'-dichloro-diphenyl-methyl)-pyridine dissolved in 120 parts by volume of glacial acetic acid are agitated with 0.5 part of platinum oxide in an atmosphere of hydrogen until the theoretical quantity of hydrogen has been absorbed. Working up is carried out in the manner already described. The 2-(p:p'-dichloro-diphenyl-methyl)-piperidine thus obtained is treated with dimethyl sulfate in ethylacetate.

The above mentioned starting material may be prepared by condensing 78.6 parts of p:p'-dichloro-diphenyl-acetonitrile and 13 parts of sodamide in 200 parts by volume of toluene with 55 parts of 2-bromopyridine and then hydrolyzing the condensation product with 57 parts of potassium hydroxide in 85 parts by volume of water and 250 parts by volume of methanol at 220° C. The 2-(p:p'-dichloro-diphenyl-methyl)-pyridine boils at 194–195° C. under 0.01 mm. of pressure.

Example 6

130 parts of 2-[di-(para-methoxy-phenyl)-methyl]-pyridinium methosulphate dissolved in 250 parts by volume of methanol are agitated with 2 parts of platinum oxide at 40–45° C. in a hydrogen atmosphere until no more hydrogen is taken up. The whole is filtered, the methanol evaporated and caustic soda solution is added to the residue until it shows an alkaline reaction. The precipitated oil is taken up in ether, the ethereal solution washed with water, dried, filtered and evaporated. The residue is distilled in high vacuum, the 2-[di-(para-methoxy-phenyl)-methyl]-1-methyl-piperidine of the formula

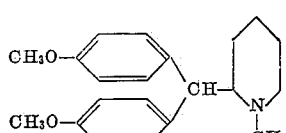

passing over at 230–233° C. under 0.01 mm. of pressure. It melts at 88–89° C.

The starting material used in this example can be prepared by condensing 63 parts of p:p'-dimethoxy-diphenyl-acetonitrile and 12 parts of sodamide in 200 parts by volume of dioxane with 45 parts of 2-bromopyridine by heating at 120° C. for 2 hours and subsequent hydrolysis with 57 parts of potassium hydroxide dissolved in 250 parts by volume of methanol and 85 parts by volume of water for 5 hours at 220° C. The p:p'-dimethoxy-diphenyl-methyl-pyridine thus obtained is reacted with dimethyl sulphate in ethyl acetate.

The new compounds can be used as medicaments, for example, in the form of pharmaceutical preparations which contain them in admixture with a pharmaceutical organic or inorganic carrier material suitable for enteral or parenteral application. For the production of these preparations such as substances are concerned as do not react with the new compounds, so for example water, gelatin, lactose, starch, magnesium stearate, talc, vegetable oils, benzyl alcohols, gums, polyalkylene glycols, vaseline, cholesterol, or other known medicament carriers. The pharmaceutical preparations can take the form of, for example, tablets, dragees, salves, creams, or are in liquid form as solutions, suspensions or emulsions. They are sterilized if desired, and/or may contain auxiliary substances such as preservatives, stabilizing, wetting or emulsifying agents, salts which vary the osmotic pressure or buffer substances. They may also contain other therapeutically valuable substances. The pharmaceutical preparations are obtained by the usual methods. For example the following preparations can be made:

| Tablets | Mg. | Mg. |
|---|---|---|
| 2-diphenylmethyl-1-methyl-piperidine | 1.0 | 5.0 |
| Talcum | 1.0 | 5.0 |
| Lactose | 5.7 | 3.7 |
| Gelatine | 52.0 | 50.0 |
| Wheat Starch | 1.0 | 1.0 |
| Arrowroot | 30.0 | 30.0 |
| Magnesium Stearate | 10.0 | 10.0 |
| | 0.3 | 0.3 |
| | 100.0 | 100.0 |

Ampules: Mg.
    2-diphenylmethyl-1-methyl-piperidine _____ 2.0
    Sodium chloride _____ 15.0
    Secondary sodium phosphate _____ 2.0
    Primary sodium phosphate _____ 4.0
    Distilled water to make up 2.0 cc.

What is claimed is:
1. 2-diphenylmethyl-1-allyl-piperidine.
2. The therapeutically useful acid addition salts of 2-diphenylmethyl-1-allyl-piperidine.

References Cited in the file of this patent
UNITED STATES PATENTS

| 2,599,365 | Berger | June 3, 1952 |
| 2,739,968 | Sperber | Mar. 27, 1956 |
| 2,739,969 | Sperber | Mar. 27, 1956 |
| 2,820,038 | Hoffmann et al. | Jan. 14, 1958 |